United States Patent [19]

Schuler

[11] Patent Number: 4,896,970
[45] Date of Patent: Jan. 30, 1990

[54] FEED MIXER

[75] Inventor: Dorland H. Schuler, Griswold, Iowa

[73] Assignee: Schuler Mfg. & Equip. Co., Inc., Griswold, Iowa

[21] Appl. No.: 226,438

[22] Filed: Aug. 1, 1988

Related U.S. Application Data

[63] Continuation-in-part of Ser. No. 924,207, Oct. 28, 1986, Pat. No. 4,799,800.

[51] Int. Cl.⁴ .............................................. B01F 7/08
[52] U.S. Cl. .................................. 366/296; 198/672; 241/101 B; 241/260.1; 366/603
[58] Field of Search ............... 366/296, 293, 294, 295, 366/297, 298, 299, 300, 301, 318, 319, 324, 90; 198/672, 311; 241/260.1, 101 B

[56] References Cited

U.S. PATENT DOCUMENTS

| | | |
|---|---|---|
| 616,371 | 12/1898 | Swearengen . |
| 2,010,579 | 9/1935 | Broadfield . |
| 3,638,920 | 2/1972 | Davis . |
| 3,672,640 | 6/1972 | Crose . |
| 3,765,526 | 10/1973 | Hubbard .............................. 198/672 |
| 3,840,189 | 10/1974 | Kanengieter .................... 241/101 B |
| 3,968,998 | 7/1976 | Wolf ................................. 241/260.1 |
| 3,995,836 | 12/1976 | Carter et al. . |
| 4,310,252 | 12/1982 | Ryan .................................... 366/186 |
| 4,447,158 | 5/1984 | Simon ................................. 366/297 |
| 4,480,927 | 11/1984 | Peat et al. ........................... 366/299 |
| 4,506,990 | 3/1985 | Neier et al. ......................... 366/299 |
| 4,597,672 | 7/1986 | Neier et al. ......................... 366/186 |

OTHER PUBLICATIONS

"The Harvestore Model 441 Batch Mixer . . . ", A. O. Smith, Harvestore Products Inc., 550 W. Algonquin Road, Arlington Heights, Ill. 60005, (date unknown).
RMH-500C Mixer Feeder (Brochure), (date unknown).
Ensilmixer, Oswalt Livestock Products (Brochure), (date unknown).
4 Auger Mixer Feeder, Kirby Manufacturing, Inc. (Brochure), (date unknown).
Knight Auggie Mixer/Blender/Feeders (Brochure), (date unknown).
Model 6100M Bale Feeder, Montano Mfg. Co., Inc., Merced California, (date unknown).
Lachish's R.M.H. Heavy Duty Mixer Feeder System (Brochure), (date unknown).
Qualita' Che Dura, Agliari (Brochure), (date unknown).
Marmix Feeder Mixer, F.lli Marchese S.A.S., Bolzano, Italy (Brochure), (date unknown).
Davis Trailer-Mounted Transit Mixer Feeder, (Brochure), (date unknown).
Davis Agitator-Auger Mixer (Brochure), (date unknown).
The Farm Aid Mixer-Feeder Wagon, Florida Ag Equipment, Inc., (Brochure), (date unknown).
Easi-Feeder, Richard Keenan (Brochure), (date unknown).
Roto-Mix Feed Mixers, Roto Mix, Dodge City, Kans., (Brochure), (date unknown).
Feed Handling Equipment, Steiner TMR, (Brochure), (date unknown).
Stirco Feed Mixer, Stirco, Canada, (Brochure), (date unknown).

*Primary Examiner*—Robert W. Jenkins
*Attorney, Agent, or Firm*—Zarley, McKee, Thomte, Voorhees & Sease

[57] ABSTRACT

A feed mixer is provided and includes a mixing chamber with forward and rearward end walls, a bottom wall, and opposite side walls. First and second mixing reels are rotatably mounted in end-to-end relationship within the chamber, with each reel including an axle and a plurality of elongated mixing bars operatively connected to the axle. The reels are rotated in opposite directions, whereby each reel offsets the side loading of the feed by the other reel and thereby maintain the center of gravity of the feed along the longitudinal center line of the chamber. First and second oppositely inclined augers extend along the respective side walls of the chamber and are rotated in opposite directions. The first auger moves feed away from the first reel and discharges feed into the second reel, while the second auger moves feed away from the second reel and discharges feed into the first reel. The augers float so as to prevent binding and have recessed knives for cutting the grain. Thus, the feed is thoroughly mixed by the dual reels and dual augers.

25 Claims, 5 Drawing Sheets

U.S. Patent   Jan. 30, 1990   Sheet 1 of 5   4,896,970
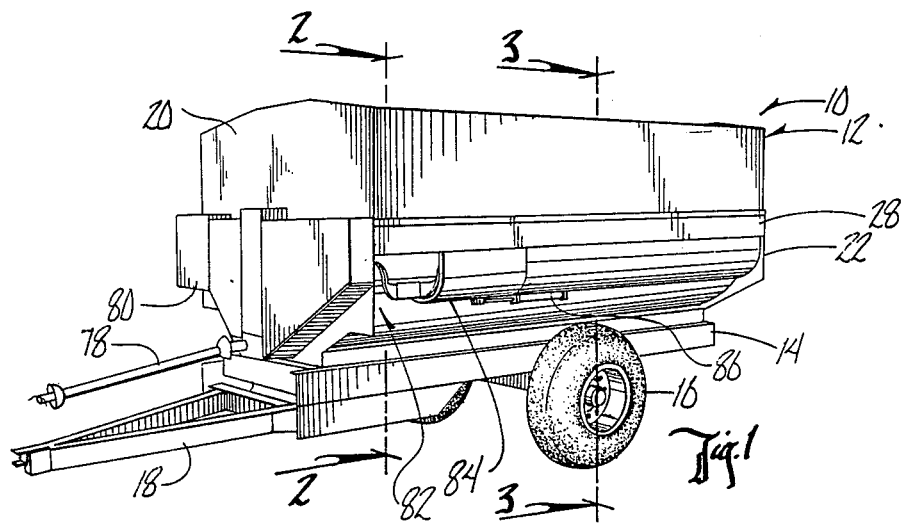
Fig. 1
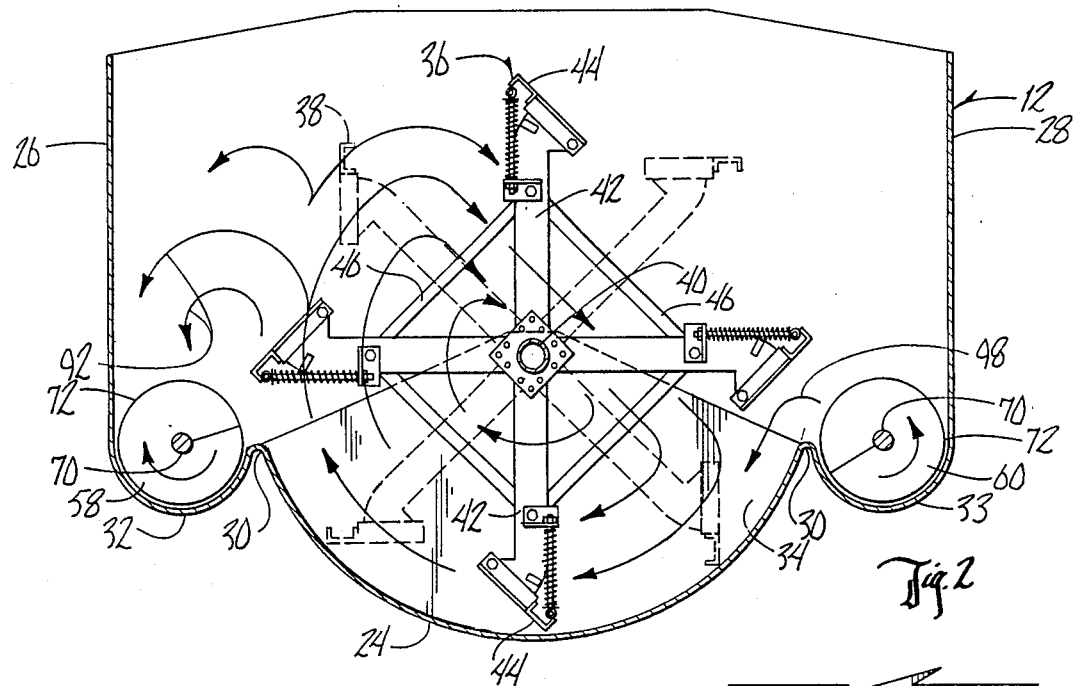
Fig. 2
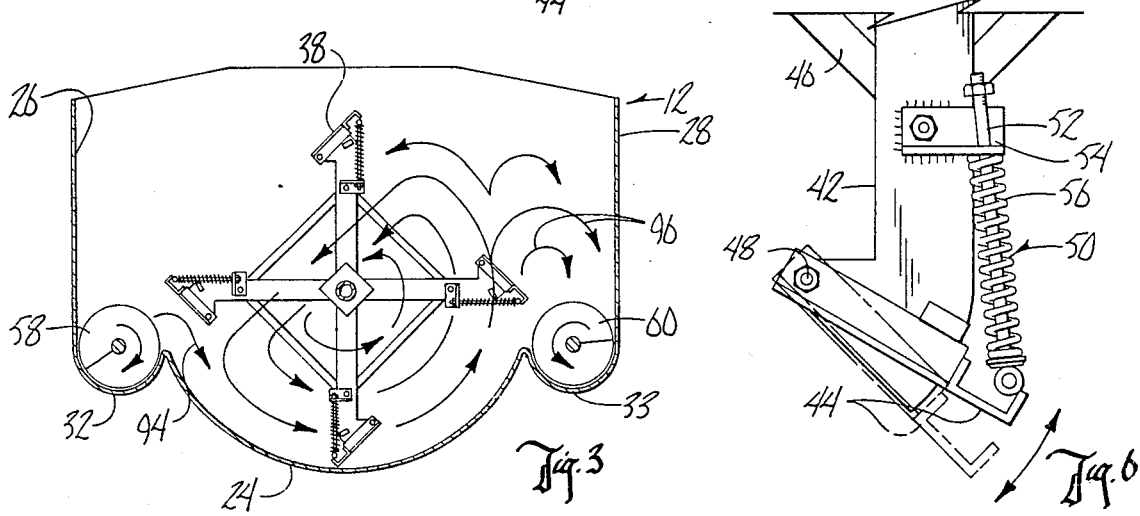
Fig. 3
Fig. 6

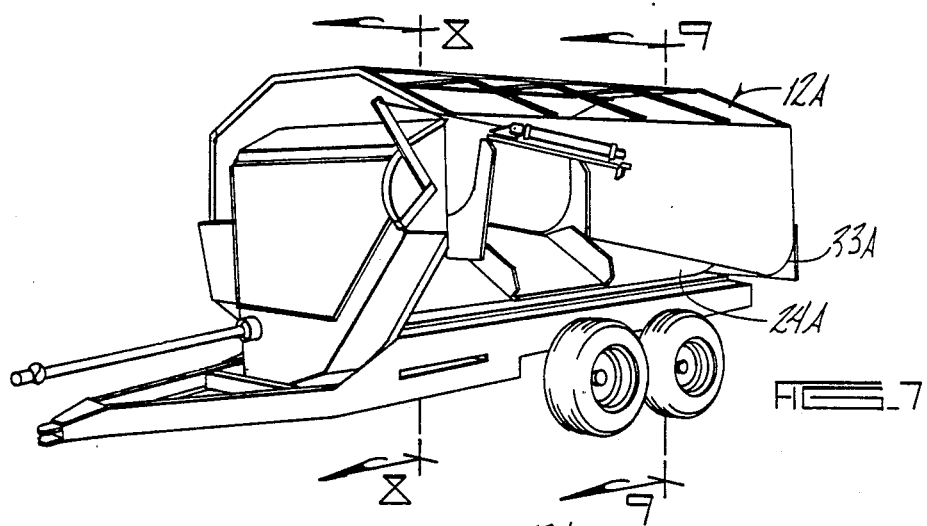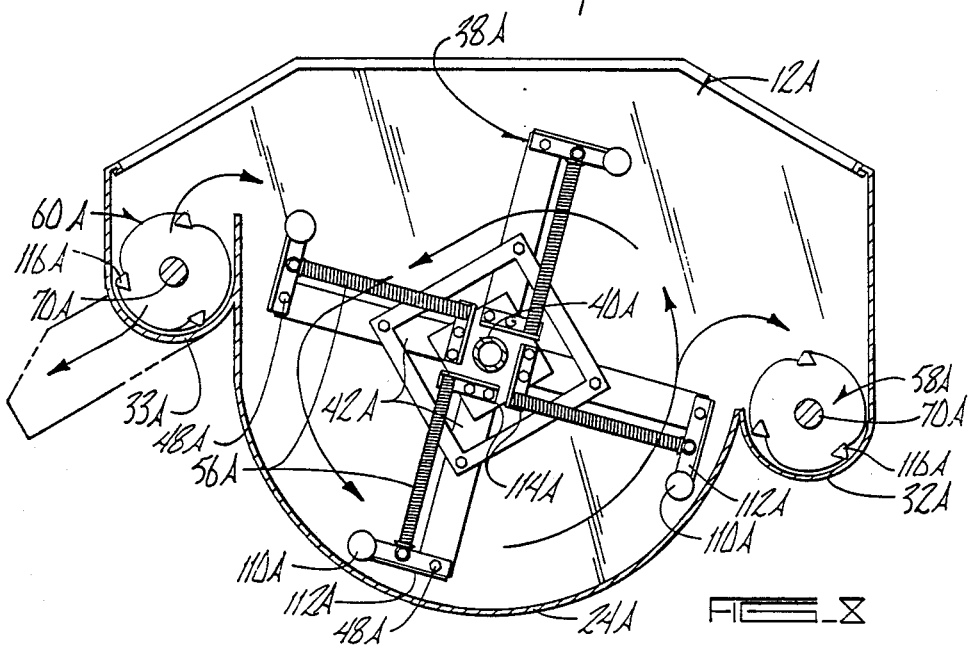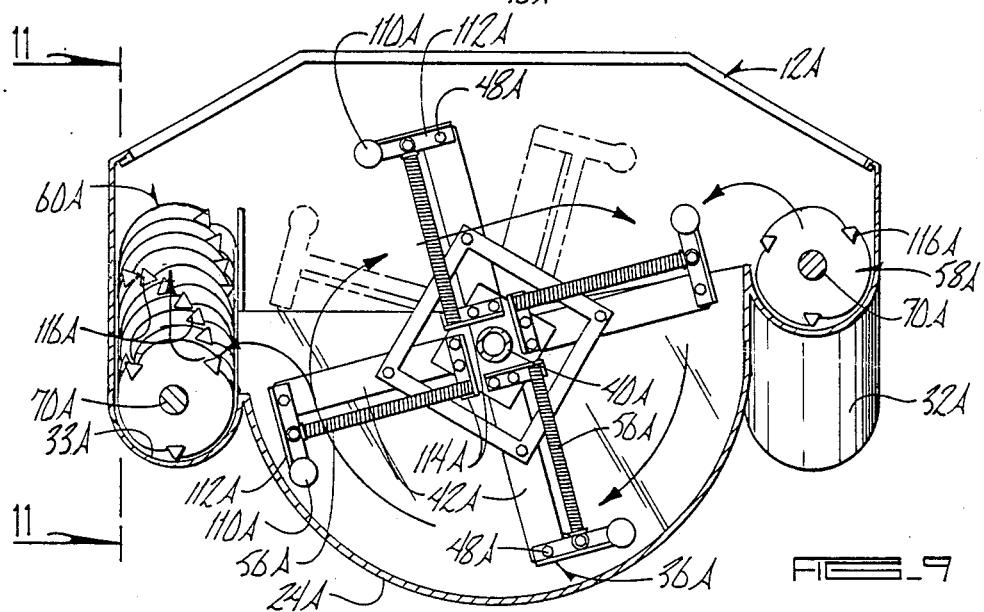

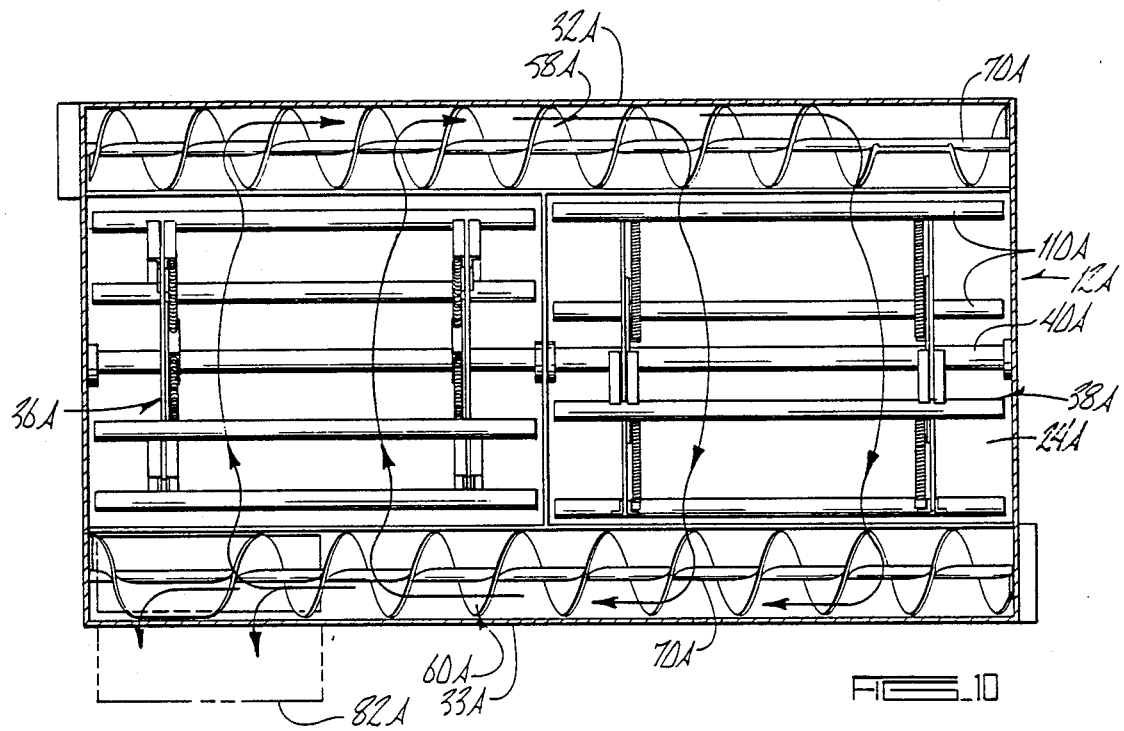
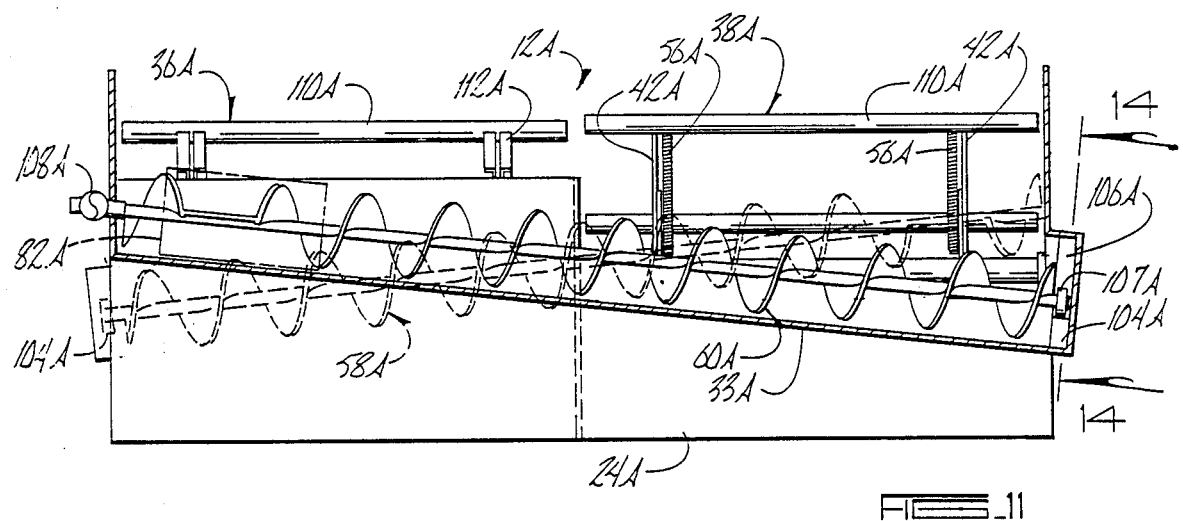
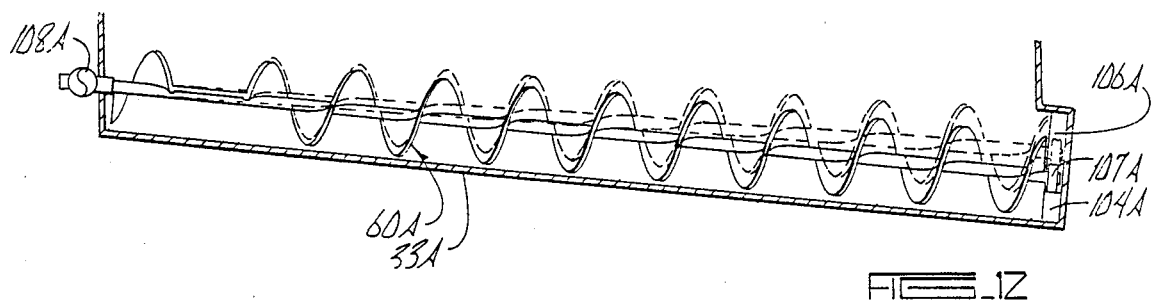

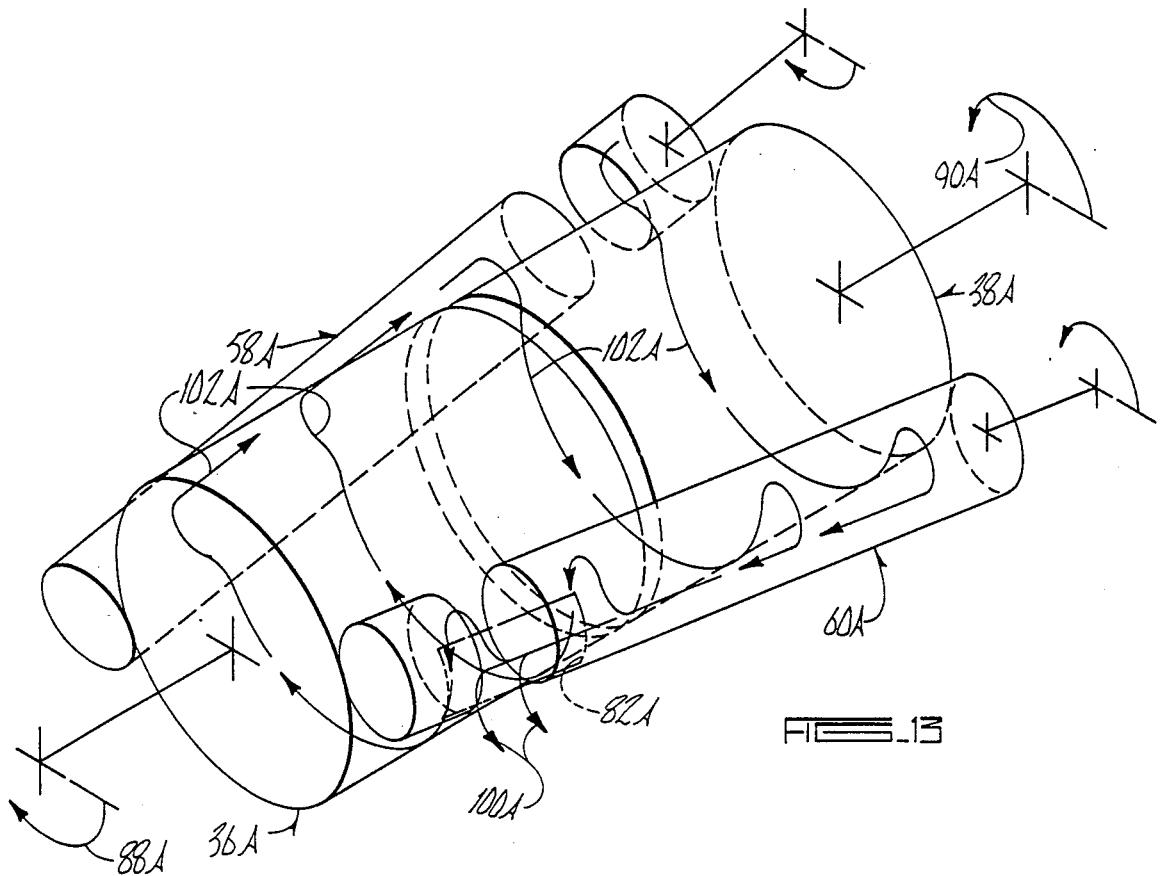
FIG_13
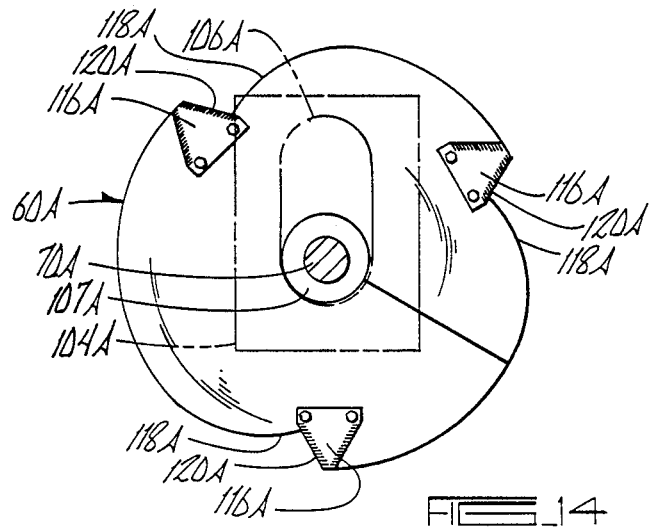
FIG_14

FEED MIXER

This is a continuation-in-part of applicant's co-pending application serial number 924,207 filed October 28, 1986 now patent no. 4,799,800.

BACKGROUND OF THE INVENTION

The present invention is directed generally to an improved feed mixer for grain, hay, silage, and other livestock feed substances. Conventional feed mixers typically have an elongated chamber with a rotatable reel extending along the length of the chamber for mixing the feed. One or more augers have been used to convey the feed from one end of the chamber to the other, and for discharging the mixed feed.

These conventional feed mixers have several shortcomings. First, since the reel rotates in one direction, there is a tendency for the feed being mixed to be loaded to one side of the chamber such that the center of gravity of the feed is not in the center of the chamber. Also, the conveying augers are usually mounted at an elevation above the central axle of the reel, thereby necessitating increased power for driving the reel which must lift the feed up to the auger inlet. Furthermore, there is a tendency for the reel paddles to bind against the bottom wall of the chamber when lumps of feed are encountered. Finally, hay and the like often becomes wrapped around the auger shaft, thereby impairing the operation of the auger.

Accordingly, a primary objective of the present invention is the provision of an improved feed mixer.

Another objective of the present invention is the provision of a feed mixer having inclined augers which minimize the power requirements of the mixer.

A further objective is the provision of a feed mixer having reels with paddles which are pulled through the mixing chamber so as to minimize the power requirements of the mixer.

Still another objective is the provision of a feed mixer having an auger with recessed knife blades for cutting and tearing bales of hay and long grain fibers.

Another objective of the present invention is the provision of a feed mixer having dual reels which rotate in opposite directions to thoroughly mix the feed.

A further objective of the present invention is the provision of a feed mixer having augers which rotate in opposite directions on each side of the feed chamber so as to move the feed to and from each end of the chamber.

Still another objective of the present invention is the provision of a feed mixer wherein the augers are designed to eliminate or minimize the wrapping of hay and the like around the auger shaft.

Another objective of the present invention is the provision of a feed mixer having pivotally mounted reel paddles so as to prevent binding of the paddles against the walls of the chamber.

Another objective of the present invention is the provision of a feed mixer which is economical to manufacture, and efficient and durable in use.

SUMMARY OF THE INVENTION

The feed mixer of the present invention has an elongated mixing chamber with forward and rearward end walls, a bottom wall, and opposite side walls. First and second mixing reels are rotatably mounted within the chamber. Each reel includes an axle, a plurality of support arms extending radially outwardly at each end of the axle, and elongated mixing paddles or bars pivotally secured to corresponding pairs of the support arms at opposite ends of the reel. Spring bias means normally urge the paddles or bars toward the bottom wall of the chamber while permitting the paddles or bars to deflect away from the bottom wall to prevent binding of feed between the paddle or bar and the bottom wall of the chamber. The arms of the first reel are offset approximately 56° with respect to the arms of the second reel.

The feed mixer further includes first and second augers having opposite inlet and outlet ends and extending along the respective side walls of the chamber. The augers are rotated in opposite directions, whereby the first auger moves feed away from the first reel and discharges feed into the second reel, and the second auger moves feed away from the second reel and discharges feed into the first reel. In an alternative embodiment, the augers are inclined so as to allow feed to be deposited into the augers from the mixing reel at an elevation below the reel axle and to allow feed to be discharged from the augers at an elevation above the reel axle, thereby minimizing power requirements. Each auger includes a central shaft, a length of first flighting extending from the inlet end substantially along the length of the auger, and terminating short of the outlet end thereof for conveying feed toward the outlet end, and a length of second flighting extending from the outlet end for conveying feed away from the outlet end. These first and second reversed flightings on each auger enhance the discharge of feed from the auger to the respective reel. Each auger also includes an auger paddle extending between the first and second flights, which prevents hay and the like from wrapping around the auger shaft. The augers also include recessed knife or scythe sections on the flighting to cut elongated grain and to break up bales of hay and the like.

A feed discharge port is provided at the raised outlet end of the second auger for discharging mixed feed from the chamber. A sliding door moves along the auger trough to open and close the discharge port.

BRIEF DESCRIPTION OF THE DRAWINGS

FIG. 1 is a perspective view of the feed mixer of the present invention.

FIG. 2 is a sectional view taken along lines 2—2 of FIG. 1.

FIG. 3 is a sectional view taken along lines 3—3 of FIG. 1.

FIG. 6 is an enlarged end view showing the pivotal movement of a reel paddle.

FIG. 7 is a perspective view similar to FIG. 1 showing an alternative embodiment of the feed mixer of the present invention.

FIG. 8 is a sectional view taken along lines 8—8 of FIG. 7.

FIG. 9 is a sectional view taken along lines 9—9 of FIG. 7.

FIG. 10 is a top elevation view of the mixer shown in FIG. 7.

FIG. 11 is a sectional side elevation view taken along lines 11—11 of FIG. 9, showing the inclination of the augers.

FIG. 12 is a sectional view showing a floating auger.

FIG. 13 is a schematic view illustrating the movement of feed with in the mixer of the alternative embodiment.

FIG. 14 is a sectional view taken along lines 14—14 of FIG. 11.

DETAILED DESCRIPTION OF THE DRAWINGS

Figure 4:
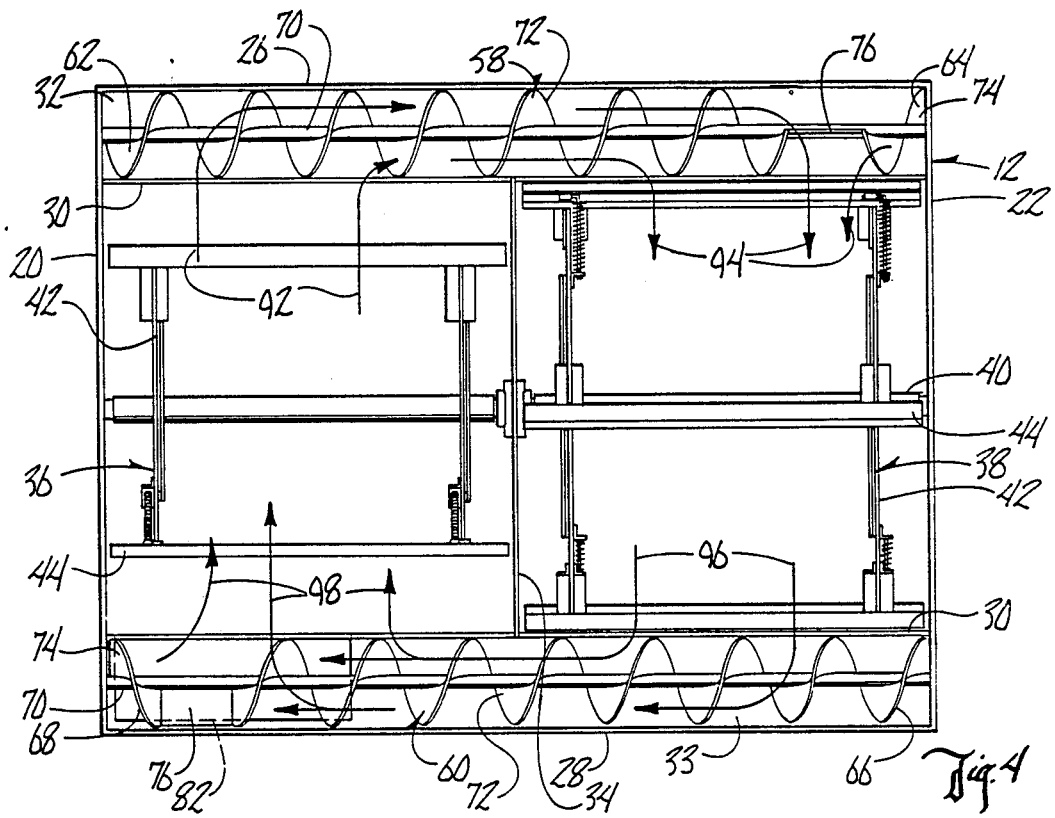
FIG. 4 a top elevational view of the feed mixer.

The feed mixer of the present invention is generally designated in the drawings by the reference numeral 10. Mixer 10 includes a mixing chamber 12 which is mounted upon a frame 14. Frame 14 is supported by a pair of wheels 16 and is adapted to be hitched to a tractor (not shown) by a tongue 18 attached to frame 14.

Chamber 12 has a forward end 20, a rearward end 22, a bottom wall 24, and opposite side walls 26 and 28, as best seen in FIG. 2. The top of chamber 12 is open to provide easy loading of feed into the chamber. Bottom wall 24 is curved upwardly from the longitudinal center line of chamber 12, and terminates in an upper ridge 30 spaced inwardly from each side wall. Concave auger troughs 32, 33 extend between upper ridge 30 and the respective side wall 26, 28. A vertically disposed central plate 34 is rigidly secured to bottom wall 24 midway between forward end 20 and rearward end 22 of chamber 12, as best seen in FIGS. 2 and 4.

A first mixer reel 36 and a second mixer reel 38 are rotatably mounted in end-to-end relationship within chamber 12. More particularly, each reel 36, 38 includes an axle 40, a plurality of arms 42 extending radially outwardly from each end of axle 40, and a plurality of elongated paddles 44 pivotally secured to the outer ends of a pair of arms 42 at opposite ends of axle 40. As seen in FIG. 4, axle 40 of reel 36 extends from forward end 20 of chamber 12 and central plate 34, while axle 40 of second reel 38 extends from central plate 34 to the rearward end 22 of chamber 12. Appropriate bearings rotatably support axles 40 at their opposite ends. Support members 46 extend between adjacent arms 42 to provide structural rigidity to the reels 36, 38.

As best seen in FIGS. 2 and 6, each paddle 44 is pivotally connected to the respective arms 42 by a pin 48. Each paddle 44 is also disposed at approximately a 45° angle with respect to bottom wall 24 of chamber 12. Spring bias means 50 has opposite ends attached to paddle 44 and arm 42 so as to normally urge paddle 44 toward bottom wall 24, while permitting the paddle to deflect away from the bottom wall when encountering a lump of feed material so as to eliminate binding of the feed material between the paddle and the bottom wall of the chamber. Such deflection is illustrated by solid lines in FIG. 6, with the dotted lines therein being the normal position of paddle 44. More particularly, spring bias means 50 includes an elongated shaft 52 having a lower end connected to paddle 44 and an upper end slidably extending through a flange 54 mounted on arm 42. A compressible spring 56 surrounds shaft 52 and yieldably urges paddle 44 to the position shown in dotted lines in FIG. 6.

A first auger 58 is rotatably mounted within trough 32 and a second auger 60 is mounted in trough 33. Auger 58 has an inlet end 62 and an outlet end 64 while second auger 62 similarly has an inlet end 66 and an outlet end 68. Each auger includes a rotatable shaft 70 with a first flighting 72 extending from the respective inlet end of the auger and terminating short of the respective outlet end of the auger so as to convey feed toward the outlet end. A second flighting 74 is reversed from first flighting 72 and extends from the respective outlet end of the auger towards the first flighting. An auger paddle 76 extends between the adjacent ends of the first and second flightings. Second flighting 74 enhances the discharge of feed from the auger, while auger paddle 76 prevents hay or the like from being wrapped around auger shaft 70.

Feed mixer 10 includes drive means for rotating first and second reels 36, 38 in opposite directions, and for rotating first and second augers 58, 60 in opposite directions. More particularly, the drive means of feed mixer 10 is connected to the power takeoff of the tractor by a drive shaft 78, and includes a plurality of gears and interconnecting driving chains (not shown) for imparting the proper rotation to the reels and augers. Such driving gears and chains are well known, and are housed externally of chamber 12, but within housing 80 so as to be protected from the elements and from feed, and for safety purposes. The gears and driving chains are self-lubricating.

Figure 5:
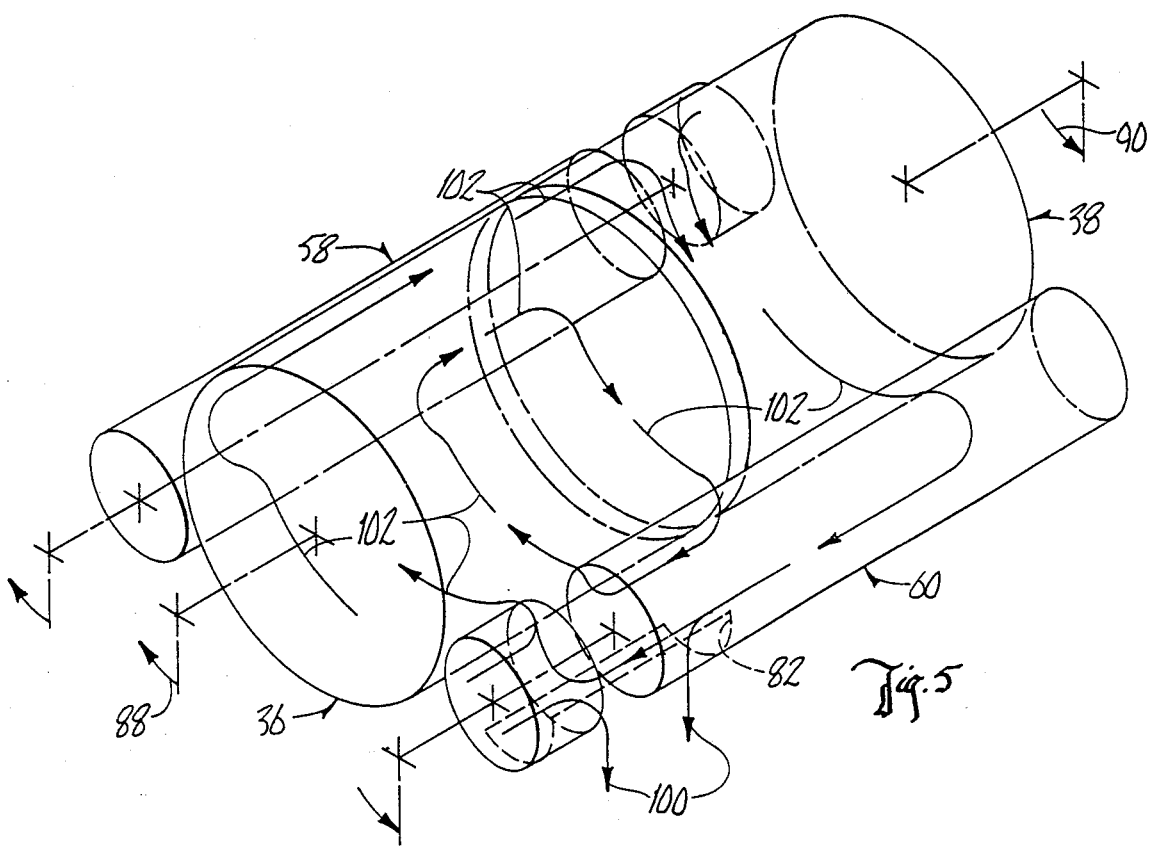
FIG. 5 is a perspective schematic view illustrating the movement of within the mixing chamber.

Auger trough 33 includes a discharge port 82 adjacent the discharge end thereof, as illustrated in FIG. 5. A door 84 slides with respect to discharge port 82 to open and close the port. The movement of door 84 is controlled by hydraulic cylinder 86, or in the alternative, door 84 may be manually moved between the open and closed positions.

In operation, first reel 36 and second reel 38 are rotated in opposite directions, as indicated by arrows 88 and 90 in FIG. 5, so that the center of gravity of the feed remains substantially along the longitudinal center line of chamber 12. More particularly, as represented by the semicircular arrangement of arrows in FIGS. 2 and 3, each reel tends to load the feed material to one side of the chamber. Since each reel tends to load the feed mixed thereby to opposite sides of chamber 12, the overall center of gravity remains along the longitudinal centerline of the chamber.

As first reel 36 rotates, paddles 44 thereon carry feed along bottom wall 24 of chamber 12. As the paddles pass by first auger 58, a portion of the feed is deposited therein as indicated by arrows 92 in FIGS. 2 and 4. The feed is conveyed by auger 58 to second reel 38 wherein the feed is discharged, as indicated by arrows 94 in FIGS. 3 and 4. Second reel 38, which is rotating in the opposite direction as first reel 36, moves feed along bottom wall 24 of chamber 12 and deposits a portion of such feed into second auger 60, as indicated by arrows 96 in FIGS. 3 and 4, which conveys the feed away from second reel 38. The feed carried by auger 60 is either discharged back into the path of first reel 36, as indicated by arrows 98 in FIGS. 2 and 4, or discharged out of chamber 12 through discharge port 82, as indicated by arrows 100 in FIG. 5.

Thus, the feed is thoroughly mixed by the rotating reels 36, 38 and by the augers 58, 60 which moves the feed from end to end within the chamber, along a circular or rectangular path as indicated by arrows 102 in FIG. 5. Since auger shafts 70 are positioned at an elevation below reel axles 40, the distance which the feed is carried upwardly by paddles 44 is minimized, thereby minimizing the power required to drive reels 36 and 38.

An alternative embodiment is shown in FIG. 7-14. In these figures, similar parts are labeled with similar reference numerals as in the first embodiment previously described and shown in FIGS. 1-6, with the suffix "A" being added to the reference numeral to indicate this alternative embodiment.

One primary difference in the alternative embodiment is that augers 58A and 60A are inclined in opposite directions. Accordingly, auger troughs 32A and 33A are also oppositely inclined. Augers 58A, 60A are thus positioned below reel axle 40A at their intake ends and elevated above axle 40A at their discharge ends, as best seen in FIG. 8 and 9. This inclination of the augers minimizes the power requirements of the feed mixer and shortens the mixing time. Also, with the inclined augers, the feed mixer has improved operation when stationed on sloping ground. The inclination is approximately 10°.

Another improvement in the alternative embodiment is that augers 58A and 60A are floating. To achieve this floating effect, the lower end of the augers is mounted in an alignment bearing 104A having an elongated, substantially vertically disposed slot 106A therein for receiving the lower end of auger shaft 70A, as seen in FIGS. 11, 12 and 14. Shaft 70A has a bushing 107A slidably received in slot 106A of bearing 104A. The upper end of shaft 70A has a U-joint connection 108A. Thus, if a large lump of feed material is fed into the auger, the auger will float within the end slot 106A of alignment bearing 104A so as to prevent binding of the auger. This floating nature of the auger is illustrated in FIG. 12 by dotted lines. This floating auger of the present invention reduces power requirements of the feed mixer by approximately 30%.

Another change from the initially described feed mixer is the use of round mixing bars 110A, rather than flat paddles 44. The use of such round mixing bars keeps long grain or hay and the like from being caught or carried continuously through the mixing chamber without being deposited into the augers.

The round mixing bars 110A are mounted substantially in the same fashion as paddles 44. More particularly, bars 110A are mounted on a support 112A, which in turn is pivotally mounted to reel arms 42A by pins 48A. A compression spring 56A extends from bar support 112A to a spring support 114A which is operatively connected to reel arms 42A. Thus, bar supports 112A and bars 110A are spring mounted so as to deflect away from bottom wall 24A when encountering lumps of feed material. Bar supports 112A extend tangentially away from the outer end of reel arms 42A in a direction opposite the rotational direction of the reels. Thus, bars 110A are pulled through the feed material behind the reel arm, rather than being pushed through the feed material if mounted ahead of the reel arm. Such pulling action of the mixing bars also reduces the power requirements of the feed mixer, as compared to bars or paddles which are pushed through the feed material.

Another option which may be included are knife or scythe sections 116A on the auger flighting, as shown in FIGS. 8, 9 and 14. These knives serve to cut elongated grain and tear up bales of hay for better mixing.

More particularly, auger flighting 72A includes notches 118A adjacent the peripheral edge of the flighting. Knife sections 116A are bolted to the flighting so that the cutting edge 120A of the knife sections resides within the notch. Thus, the cutting edge extends inwardly from the periphery of the flighting. This construction allows the peripheral edge of the auger flighting to be in close proximity to the auger trough and thereby minimize the residue grain remaining in the trough without conveyance by the auger.

Notched augers are well known in the prior art. However, the knife sections the knife sections 116a greatly improved the cutting action of the auger without being overly aggressive. Also, the knife sections can be easily removed for sharpening or replacement. Preferably, the cutting edge of 120A of the knife sections 116A are serrated.

With the feed mixer shown in the alternative embodiment, FIGS. 7-13, the same mixing action is achieved as in the previously described embodiment, though the mixing is achieved more efficiently. The feed is thoroughly mixed by the rotating reels 36A, 38A and by the augers 58A, 60A which moves the feed from end to end within the mixing chamber 12A, along a circular or continuous path as indicated by arrows 102A in FIG. 13. Since the inlet of the augers are positioned at an elevation below reel axle 40A, the distance the feed is carried upwardly by the mixing bars 110A is minimized. Also, since the discharge end of the augers is positioned at an elevation above the reel axle, the feed is dropped over the rotating reel, rather than being pushed or forced into the path of the rotating reel. Thus, the inclination of the augers minimizes the power requirements of the feed mixer 10A.

From the foregoing, it is seen that the present invention accomplishes at least all the stated objectives, including an improved feed mixer capable of mixing more material in less time and more completely.

What is claimed is

1. A feed mixing device, comprising:
a mixing chamber having forward and rearward end walls, a bottom wall and opposite side walls;
at least one rotatable mixing reel, including an axle and a plurality of elongated mixing bars operatively connected to the axle;
rotation means for rotating said reel for mixing feed within the chamber; and
first and second augers having shafts inclined in opposite directions on opposite sides of the reel and extending along respective side walls of the chamber and having opposite inlet and outlet ends, and the augers having flighting conveying feed in opposite directions within the chamber.

2. The device of claim 1 wherein the chamber further includes first and second inclined auger troughs extending longitudinally adjacent the first and second augers, respectively.

3. The device of claim 2 wherein the inlet ends of the augers are at an elevation below the mixing reel axle and the outlet ends of the augers are at an elevation above the mixing reel axle.

4. The device for claim 1 wherein the augers are inclined approximately 10° with respect to the axle of the mixing reel.

5. The device of claim 1 including first and second rotatable mixing reels positioned in an end-to-end relationship within the chamber, said rotation means rotating the first and second reels in opposite directions such that each reel moves feed toward opposite side walls of the chamber and thereby substantially maintaining the center of gravity of the feed being mixed midway between the side walls of the chamber, said first auger moving feed away from said first reel and discharging feed into said second reel, and said second auger moving feed away from said second reel and discharging feed into said first reel.

6. The device of claim 1 wherein the mixing reel includes a plurality of support arms extending radially outwardly from said axle and means for pivotally securing said mixing bars to said arms.

7. The device of claim 6 further including spring bias means for normally urging the bars toward the bottom wall of the chamber and permitting the bars to deflect away from the bottom wall of the chamber to prevent binding of feed between the bars and the bottom wall of the chamber.

8. The device of claim 7 wherein the mixing bars extend substantially 90° from said arms.

9. The device of claim 6 wherein the mixing bars are secured to said arms and extend angularly therefrom so as to pull through the feed during rotation of the reels.

10. The device of claim 1 wherein the mixing bars are substantially round in cross section.

11. The device of claim 1 wherein the augers include flighting with a peripheral edge and notches formed in the flighting adjacent the peripheral edge thereof, and knives secured to the flighting adjacent the notches for cutting the feed.

12. The device of claim 11, wherein the knives have a cutting edge located within the notches in the flighting.

13. The device of claim 1 further comprising mounting means for allowing floating of the augers.

14. The device of claim 13 wherein each auger includes a shaft with flighting, the mounting means includes an alignment bearing having a slot for slidably receiving the auger shaft adjacent the inlet end of the auger and a U-joint connector for mounting the auger shaft adjacent the outlet end of the auger, the shaft being free to slide within the slot of the bearing and thereby allow the auger to float over hard or large lumps of feed.

15. A floating auger for conveying material comprising:
an elongated auger shaft having opposite first and second ends and a longitudinal axis;
auger flighting on the shaft;
first and second bearing means for rotatably supporting opposite ends of the shaft, at least one of the bearing means allowing linear displacement of the shaft in a direction substantially perpendicular to the axis of the shaft while the shaft is operatively rotating.

16. The auger of claim 15 wherein the first bearing means includes an elongated slot for receiving one end of the shaft, the shaft being movable within the slot in a direction substantially perpendicular to the axis of the shaft.

17. The auger of claim 16 wherein the second bearing means includes a universal joint for pivotally supporting the second end of the shaft.

18. An auger for conveying and cutting material, comprising:
a shaft having flighting with a peripheral edge, the flighting having a plurality of notches formed therein adjacent the peripheral edge, and
knives secured to the flighting within each notch.

19. The auger of claim 18 wherein each knife has a cutting edge located within the notch in the flighting.

20. The auger of claim 19 wherein the cutting edge of the knife extends inwardly from the peripheral edge of the flighting.

21. The auger of claim 18 wherein the knives are releasably mounted to the flighting.

22. A feed mixing device, comprising:
a mixing chamber having forward and rearward end walls, a bottom wall and opposite side walls;
first and second rotatable mixing reels, each including an axle and a plurality of elongated round mixing bars operatively connected to the axle;
said reels being positioned within said chamber in an end-to-end relationship;
means for rotating said first and second reels in opposite directions such that each reel moves the feed towards opposite side walls of the mixing chamber and thereby substantially maintaining the center of gravity of the feed being mixed midway between the side walls of said chamber; and
a discharge port in said mixing chamber for discharging mixed feed from said chamber.

23. The device of claim 22 wherein the mixing reel includes a plurality of support arms extending radially outwardly from said axle and means for pivotally securing said mixing bars to said arms, the mixing bar being secured to said arms and extend angularly therefrom so as to pull through the feed during rotation of the reels.

24. A feed mixing device, comprising:
a mixing chamber having forward and rearward end walls, a bottom wall and opposite side walls;
first and second rotatable mixing reels, each including an axle and a plurality of elongated mixing paddles operatively connected to the axle;
said reels being positioned within said chamber in an end-to-end relationship;
first and second augers having opposite inlet and outlet ends and extending along respective side walls of said
chamber, and means for rotating the augers in opposite directions, said first auger moving feed away from said first reel and discharging feed into said second reel, and said second auger moving feed away from said second reel and discharging feed into said first reel;
said augers having flighting with a peripheral edge and notches formed in the flighting adjacent the peripheral edge thereof, and knives secured to the flighting within the notches for cutting the feed;
means for rotating said first and second reels in opposite directions such that each reel moves the feed towards opposite side walls of the mixing chamber and thereby substantially maintaining the center of gravity of the feed being mixed midway between the side walls of said chamber; and
a discharge port in said mixing chamber for discharging mixed feed from said chamber.

25. A feed mixing device, comprising:
a mixing chamber having forward and rearward end walls, a bottom wall and opposite side walls;
first and second rotatable mixing reels, each including an axle and a plurality of elongated mixing paddles operatively connected to the axle;
said reels being positioned within said chamber in an end-to-end relationship;
first and second augers having opposite inlet and outlet ends and extending along respective side walls of said chamber, and means for rotating the augers in opposite directions, said first auger moving feed away from said first reel and discharging feed into said second reel, and said second auger moving feed away from said second reel and discharging feed into said first reel;
mounting means for allowing floating of the augers while the augers are operatively rotating;
means for rotating said first and second reels in opposite directions such that each reel moves the feed towards opposite side walls of the mixing chamber and thereby substantially maintaining the center of gravity of the feed being mixed midway between the side walls of said chamber; and
a discharge port in said mixing chamber for discharging mixed feed from said chamber.

* * * * *